United States Patent [19]
Vanderbilt, Jr. et al.

[11] 3,870,972
[45] Mar. 11, 1975

[54] OSCILLATOR AND FLOW MEASURING APPARATUS

[75] Inventors: Vern C. Vanderbilt, Jr., Hagerstown; Clarence L. Zimmer, Richmond; William F. Van Ostrand, Hagerstown, all of Ind.

[73] Assignee: Dynamic Precision Controls Corporation, Hagerstown, Ind.

[22] Filed: July 6, 1972

[21] Appl. No.: 269,496

Related U.S. Application Data

[62] Division of Ser. No. 43,668, June 5, 1970, Pat. No. 3,691,824.

[52] U.S. Cl. ............... 331/140, 331/183, 333/75
[51] Int. Cl. .................................................. H03b 5/26
[58] Field of Search ........... 331/110, 140, 138, 141; 333/70, 75

[56] References Cited
UNITED STATES PATENTS

| | | | |
|---|---|---|---|
| 2,173,427 | 9/1939 | Scott | 331/140 |
| 2,602,139 | 7/1952 | Hodder et al. | 331/140 |
| 2,764,643 | 9/1956 | Sulzer | 331/140 |

*Primary Examiner*—John Kominski
*Attorney, Agent, or Firm*—Hibben, Noyes & Bicknell

[57] ABSTRACT

This disclosure deals with apparatus including an oscillator circuit generating a frequency that is determined by one or more variable resistors of the circuit, a transducer including the oscillator wherein the variable resistors are constructed to vary with certain parameters to be measured, fluid flow meters wherein the parameters are factors to be taken into account when measuring fluid flow, and apparatus for measuring the mass flow rate of non-compressible fluid.

3 Claims, 11 Drawing Figures

FIG. 11.

OSCILLATOR AND FLOW MEASURING APPARATUS

This application is a division of Vern C. Vanderbilt Jr. et al application Ser. No. 43,668 filed June 5, 1970, now U.S. Pat. No. 3,691,824 issued Sept. 19, 1972 and entitled Carburetor Evaluation System.

Figures 5, 6, 8, 9:
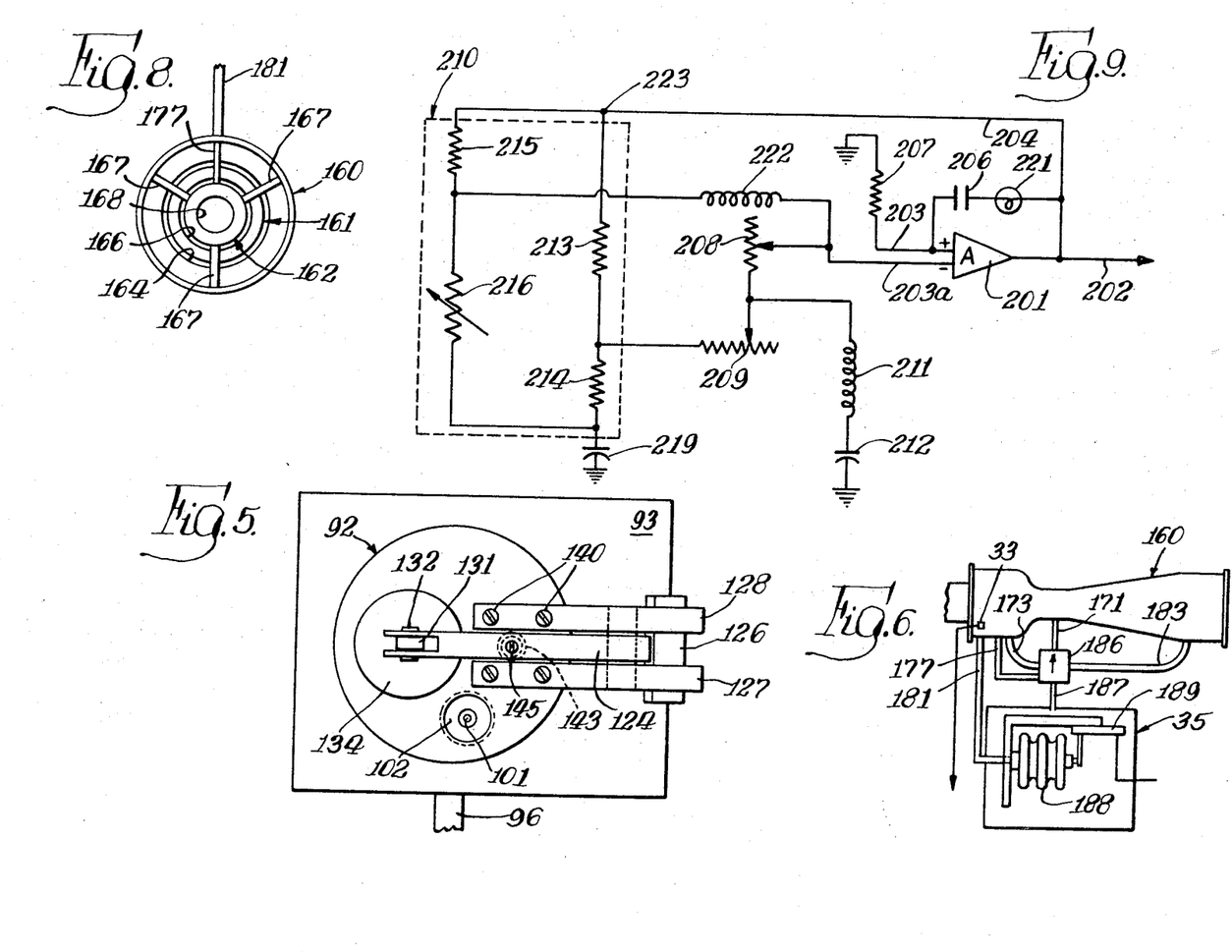
FIG. 5 is a fragmentary sectional view taken on the line 5—5 of FIG. 3.
FIG. 6 is a view showing a portion of the system for measuring the mass flow rate of air.
FIG. 8 is a reduced view taken on the line 8—8 of FIG. 7.
FIG. 9 is a view of an electrical circuit of the system.

Vanderbilt U.S. Pat. No. 3,308,360 discloses, in FIG. 3, an oscillator circuit including a notch tuning network and potentiometers for varying the frequency. Such a circuit has the disadvantage of being able to sense only one parameter at a time.

Metering devices have also been provided to measure the flow rate of a liquid by measuring the pressure difference across an orifice. Such devices have had the disadvantage that they are limited as to the range of pressure differences they are able safely to measure.

It is therefore an object of this invention to provide an improved oscillator circuit which responds simultaneously to a plurality of parameters, and comprising an amplifier having an output connection and positive and negative input connections, a positive feedback loop connecting said output connection and said positive input connection, and a notch filter connecting said output connection and said negative input connection to form a negative feedback loop, said notch filter including first and second variable resistors, and a resistance bridge connected in series between said output and negative input connections and including at least one variable resistor, the frequency of said oscillator circuit being the frequency to which said notch filter is tuned and said frequency changing as a function of the product of a change in the resistance of one of said first and second variable resistors and a change in the resistance of said one variable resistor of said bridge.

It is a further object to provide such an oscillator including sensors for measuring fuel flow.

It is another object to provide such an oscillator used with a novel device for measuring the flow rate of a liquid.

It is still another object to provide a novel device for measuring the flow rate of a liquid, comprising first and second enclosures, first conduit means for carrying the liquid into said first enclosure, second conduit means for carrying the liquid out of said second enclosure, a first orifice connecting said first and second enclosures, a second orifice connecting said first and second enclosures, and seal means for preventing liquid flow through said second orifice at flow rates below a predetermined value but permitting such flow at flow rates above said value.

Further objects and advantages of the invention will become apparent from the following description taken in conjunction with the accompanying figures of the drawings, in which.

Figures 1, 2:
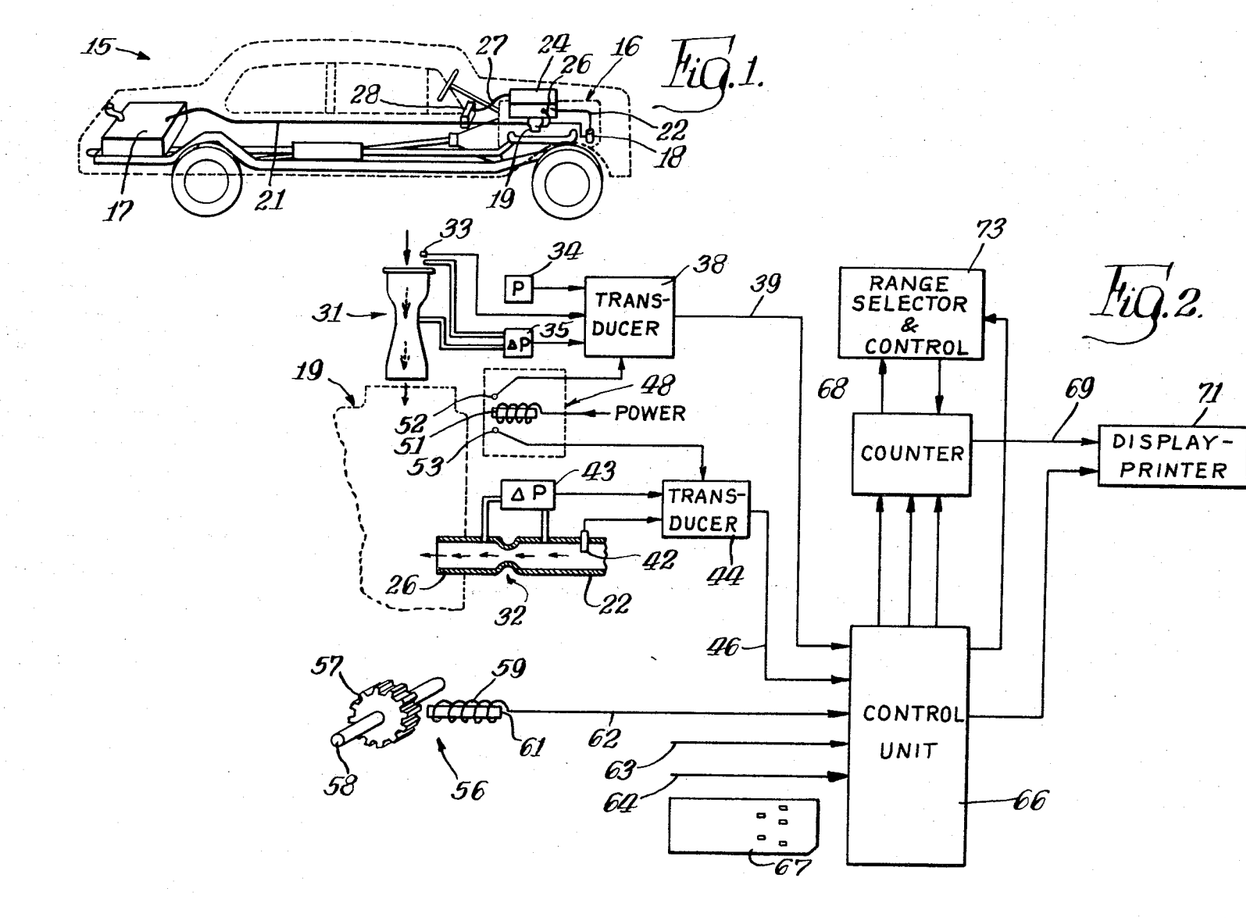
FIG. 1 is a view of an automobile equipped with a carburetor evaluation system including components embodying the invention.
FIG. 2 is a schematic illustration of the system.

In FIG. 1 is illustrated the fuel supply system of an automobile 15 including an internal combustion engine 16, the fuel supply system including a fuel storage tank 17, a fuel pump 18, and a carburetor 19. A fuel line 21 connects the fuel tank 17 to the intake of the fuel pump 18, and another line 22 conducts fuel away from the outlet or high pressure side of the fuel pump 18. Normally, the line 22 has its outlet connected directly to a float bowl of the carburetor 19, but in the present instance, it is connected to apparatus 24 of a system designed to evaluate the operation of the carburetor 19. In the present instance, the apparatus 24 is mounted on top of the air intake of the carburetor 19. Another fuel line 26 connects the apparatus 24 with the carburetor 19, thus completing the fuel flow circuit from the fuel pump 18, through the structure 24 which measures the mass per unit of time of fuel flowing to the carburetor 19. As will be described in greater detail hereinafter, the air drawn into the carburetor 19 also flows through the apparatus 24, and the apparatus 24 is constructed to measure the mass per unit of time of air flowing therethrough. The apparatus 24 is also designed to sense the fuel level in the carburetor float bowl, and the engine speed. Electrical signals representing the foregoing parameters of the carburetor 19 and the engine 16 are fed through a multiple conductor cable 27 to an instrument 28 which includes driver-operated controls and a recorder.

In FIG. 2, the carburetor 19 and the system parts connected thereto are represented schematically. Ahead of the air intake of the carburetor 19 is a multiple venturi arrangement indicated generally by the number 31, and ahead of the fuel intake to the carburetor is an orifice arrangement indicated generally by the numeral 32. The portion of the system for measuring the mass per unit of time of air flowing into the carburetor 19 further includes a temperature sensor 33, such as the thermister, positioned adjacent the entrance of the venturi 31, and pressure sensors 34 and 35. The sensor 34, which may be an aneroid barometer, measures barometric pressure, and the sensor 35 measures the pressure differential between the entrance and the throat of the venturi 31. The sensors 33, 34 and 35 are connected to a transducer 38 which generates an electrical signal on a conductor 39, the frequency of the signal on the conductor 39 being linearly related to the mass of air per unit of time flowing through the venturi 31 and into the carburetor 19.

The portion of the system for measuring the mass flow rate of fuel comprises the orifice 32, a temperature sensor 42 positioned in the line 22 to measure the temperature of the fuel flowing therethrough, and a pressure differential sensor 43 connected to measure the fuel pressure difference on opposite sides of the orifice 32. The sensors 42 and 43 are connected to another transducer 44 which generates a signal on a conductor 46 having a frequency which is linearly related to the mass of fuel per unit of time flowing into the carburetor 19.

The system further includes a probe 48 for sensing the level of the fuel in the float bowl (FIG. 10) of the carburetor. As will be described in greater detail hereinafter, the probe 48 includes an electrical heating coil 51 and a pair of temperature-sensitive elements 52 and 53, such as thermisters. In the arrangement shown in FIG. 2, the sensors 52 and 53 are connected to the transducers 38 and 44, respectively.

The system further includes a unit 56 for sensing the speed of the engine 16. In the present instance, the unit 56 includes a toothed wheel or gear 57 fastened to a shaft 58 which is connected to be rotated by the crankshaft of the engine at a rate which is linearly related to the speed of the engine. An inductance pick-up comprising a coil 59 and a permanent magnet 61 is located adjacent the wheel 57, and the coil 59 is connected to a conductor 62. Rotation of the toothed wheel 57 by the engine 16 results in electrical pulses being generated and transmitted by the conductor 62, the frequency of the pulses being linearly related to the rate of rotation of the wheel 57 and the engine 16.

The signals on the conductors 39, 46 and 62, as well as any additional input signals on other conductors 63 and 64 which may be connected to sense other operating parameters of the engine, are connected to a control unit 66 of a computer-counter (FIG. 11) located in the control instrument 28 (FIG. 1). When an operator wishes to take a reading, he inserts a punched card 67 (FIG. 2) into the computer-counter. The punched instructions programmed on the card 67 are "read" and operate the remainder of the units in the instrument 28 as will be later described in connection with FIG. 11. The remaining units of the computer-counter include a counter 68 which provides a signal on a conductor 69 to a display-printer unit 71 which displays and/or prints the information. An electronic frequency responsive control 73 is preferably also provided to enable the printer 71 to operate only when the engine is operating in a selected range.

Figure 3:
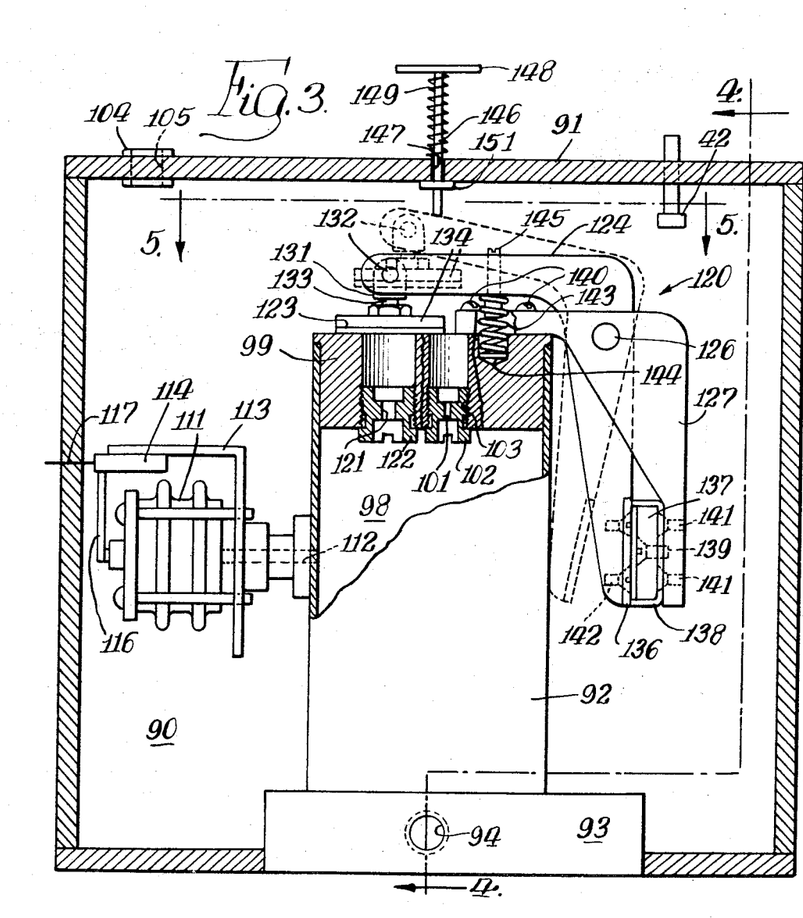
FIG. 3 is a sectional view showing a portion of the system for measuring the mass flow rate of fuel.
Figure 4:
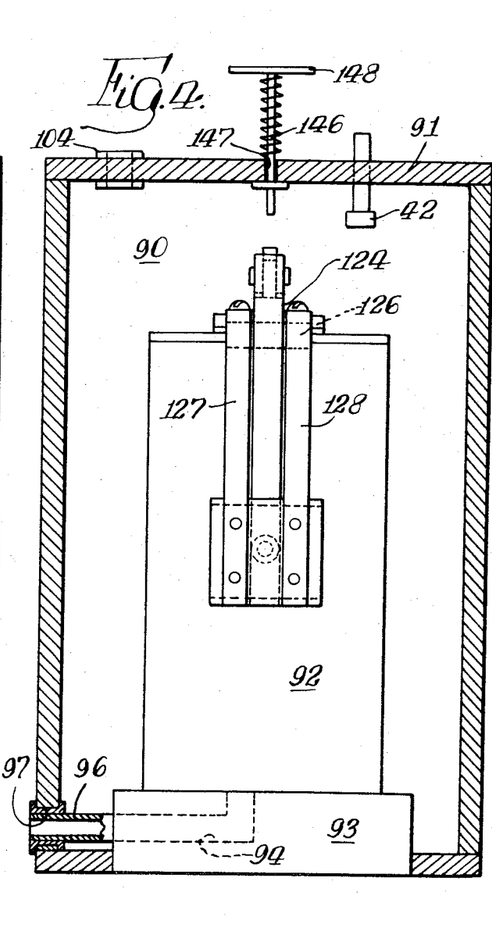
FIG. 4 is a sectional view taken on the line 4—4 of FIG. 3.

FIGS. 3 through 5 illustrate the orifice and transducer for measuring the mass of fuel flowing into the carburetor. This structure operates on the principle that the pressure drop through an orifice through which the fuel flows is related to the rate at which fuel flows through the orifice. This structure comprises a hollow, generally rectangular enclosure 91 having a hollow member 92 secured within the enclosed space 90 thereof. The axis of the member 92 extends generally vertically and it is located at approximately the center of the enclosure 91. The lower end of the member 92 is secured to a flat base 93 having a fuel intake passage 94 formed therein, the base 93 being secured to the bottom wall of the enclosure 91. As shown in FIG. 4, a tube 96 extends from the passage 94 and through a hole 97 formed in a wall of the enclosure 91 and the fuel line 22 leading from the fuel pump 18 (FIG. 1) is connected to the tube 96. Thus, fuel from the pump 18 flows through the tube 96, through the passage 94 formed in the base 93, and into the hollow interior 98 of the member 92.

The upper end of the member 92 is closed by a cylindrical block 99 which is sealingly secured within the upper end of the member 92. A vertically extending orifice 101 is formed in a screw 102 which is threaded in a hole 103 formed through the block 99. Thus, fuel flowing into the interior 98 of the member 92 flows upwardly through the orifice 101 and into the space 90 formed by the enclosure 91 and externally of the member 92. A fitting 104 (FIG. 4) is fastened in an opening 105 formed through the top wall of the enclosure 91, the fitting 104 being adapted to be connected to the line 26 which leads from the structure 24 to the intake of the carburetor 19.

During operation of the engine, the fuel in the interior 98 of the member 92 is at a higher pressure than the fuel in the enclosure 90. This is true because consumption of fuel by the engine causes fuel flow out of the enclosure 90 with a resultant pressure drop in the enclosure 90, whereas the pressure in the interior 98 of the member 92 is substantially at the pressure of the fuel delivered by the pump 18 which is nearly constant. The pressure differential between the interior 98 and the enclosure 90 is related to the mass of fuel per unit of time flowing through the orifice 101. To measure this pressure difference, a commercially available bellows 111 is provided, having its interior connected by a passage 112 to sense the fuel pressure within the interior 98 and its exterior located to sense the pressure in the enclosure 90. A frame 113 supports the bellows 111 on a wall of the member 92, and the exterior surface of the bellows 111 is exposed to the fuel within the enclosure 90. The frame 113 also supports a variable resistor 114 having a movable wiper 116 which is attached to the movable outer end of the bellows 111. A conductor 117 connects the variable resistor 114 in the circuit of the transducer 44, which will be described in greater detail hereinafter.

When the engine is operating at idling speeds, the fuel pressure within the enclosure 90 around the exterior of the bellows 111 will be nearly that of the pressure within the bellows because fuel consumption is relatively low. However, when the engine speeds up and consumes a greater amount of fuel, the pressure within the enclosure 90 drops and is greater than the pressure within the interior of the bellows. The bellows 111 then expands and the variable resistor 114 reflects the expansion.

When the pressure difference reaches a certain level, the bellows reaches the limit of its normal expansion, and thereafter there is danger that damage may occur to the bellows 111 and the variable resistor 114. Such damage is prevented, however, by providing a second orifice 121 formed in a screw 122 located adjacent the first-mentioned orifice 101. Also provided is a relief valve arrangement 120 opening the second orifice 121 only at high pressure differences. The orifice 121 is closed at low pressures by a resilient disc-shaped seal 123 of the arrangement 120, which is held against the upper surface of the member 99 and covers the orifice 121. The seal 123 is supported by an L-shaped latch arm 124 which is pivotally fastened by a pin 126 (FIGS. 3 and 5) to a pair of L-shaped supports 127 and 128. The supports 127 and 128 are fastened to the member 99 by screws 140. The latch arm 124 includes a horizontal section which extends over the member 92, and a vertical section which extends adjacent a vertical side of the member 92. The end of the horizontal section of the arm 124 is pivotally connected to a link 131 by another pin 132. As shown in FIG. 3, the link 131 supports a screw 133 to which is fastened a metal disc 134, and the seal 123 is secured on the lower side of the disc 134. The screw 133 may be turned to adjust the vertical position of the seal 123. The vertical section of the arm 124 has a flat plate 136, which is made of a magnetic material, secured to the free end thereof. The lower ends of the two supports 127 and 128 extend downwardly generally parallel to the arm 124, and a permanent magnet 137 is secured between the lower ends thereof. The magnet 137 is held in a channel-shaped member 138 by a screw 139, and the member 138 is secured to the lower ends of the supports 127 and 128 by additional screws 141. The plate 136 is secured to the lower end of the arm 124 by screws 142. The magnet 137 is preferably recessed in the member 138 so that it is not engaged by the plate 136. Further, the plate 136 is preferably prevented from being too firmly held by the magnet 137, and this may be accomplished as by plating the member 138 with a non-magnetic metal.

When the assembly is in its latched position, shown in full lines in FIG. 3, the plate 136 is held by the magnet 137 and the resilient seal 123 covers the orifice 121. A compression spring 143 is positioned in a hole 144 between the horizontally extending section of the arm 124 and the upper surface of the member 99, and tends to lift the seal 123 off the member 99 and thus open the orifice 121. However, at low engine speeds the force of the magnet 137 is sufficiently strong to overcome the force of the spring 143 and the force of the fuel acting through the orifice 121. An adjusting screw 145 is preferably fastened to the arm 124 above the spring 143 in order to adjust the force of the spring when the assembly is latched. As engine speed increases and the fuel pressure within the enclosure 90 drops, the fuel pressure acting through the orifice 121 against the underside of the seal 123, combined with the force of the spring 143 is sufficient at a certain speed to overcome the force of the magnet 137. The arm 124 then moves to its tripped position shown in dashed lines in FIG. 3 wherein the plate 136 is displaced from the magnet 137 and the seal 123 is lifted off the member 99. Thereafter, fuel flows from the interior 98 through both of the orifices 101 and 121. The size of each orifice will depend, of course, upon the size of the engine. As an example, the diameter of the small orifice 101 may be approximately 0.043 inch and the diameter of the large orifice 121 may be approximately 0.065 inch.

Movement of the arm 124 to its tripped position accomplishes two functions. First of all, it prevents damage to the bellows 111 because it is adjusted to trip before the pressure is great enough to damage the bellows. Secondly, it extends the range of the fuel sensing apparatus by increasing the effective size of the orifice through which the fuel flows. Consequently, a single bellows transducer is capable of sensing the mass flow of fuel over a wide range of fuel flow rates.

After the arm 124 has moved to the tripped position, it is necessary to return it to its latched position before the system may be used again at low engine speeds. To return the arm 124 to the latched position, a manually operable push-button type of device is provided, comprising a pin 146 which extends through a sealed opening 147 formed in the top wall of the enclosure 91 above the horizontally extending section of the arm 124. A flat disc 148 is secured to the upper end of the pin 146, and a spring 149 is positioned between the disc 148 and the enclosure 91 to urge the pin 146 upwardly. A washer 151 is secured to the pin 146 within the enclosure 91 to prevent the pin from coming out of the hole 147. When the operator presses downwardly on the disc 148, the pin 146 is moved downwardly and its lower end engages the arm 124 and moves it to the point where the force of the magnet 137 pulls the arm 124 to its latched position. A solenoid acutated device could, of course, be provided in place of the manually operated pin 146 and the disc 148 to return the arm 124 to its latched position.

As shown in FIGS. 3 and 4, the fuel temperature sensor 42 may be suspended from the top wall of the member 91 within the enclosure 90.

Figures 7, 10:
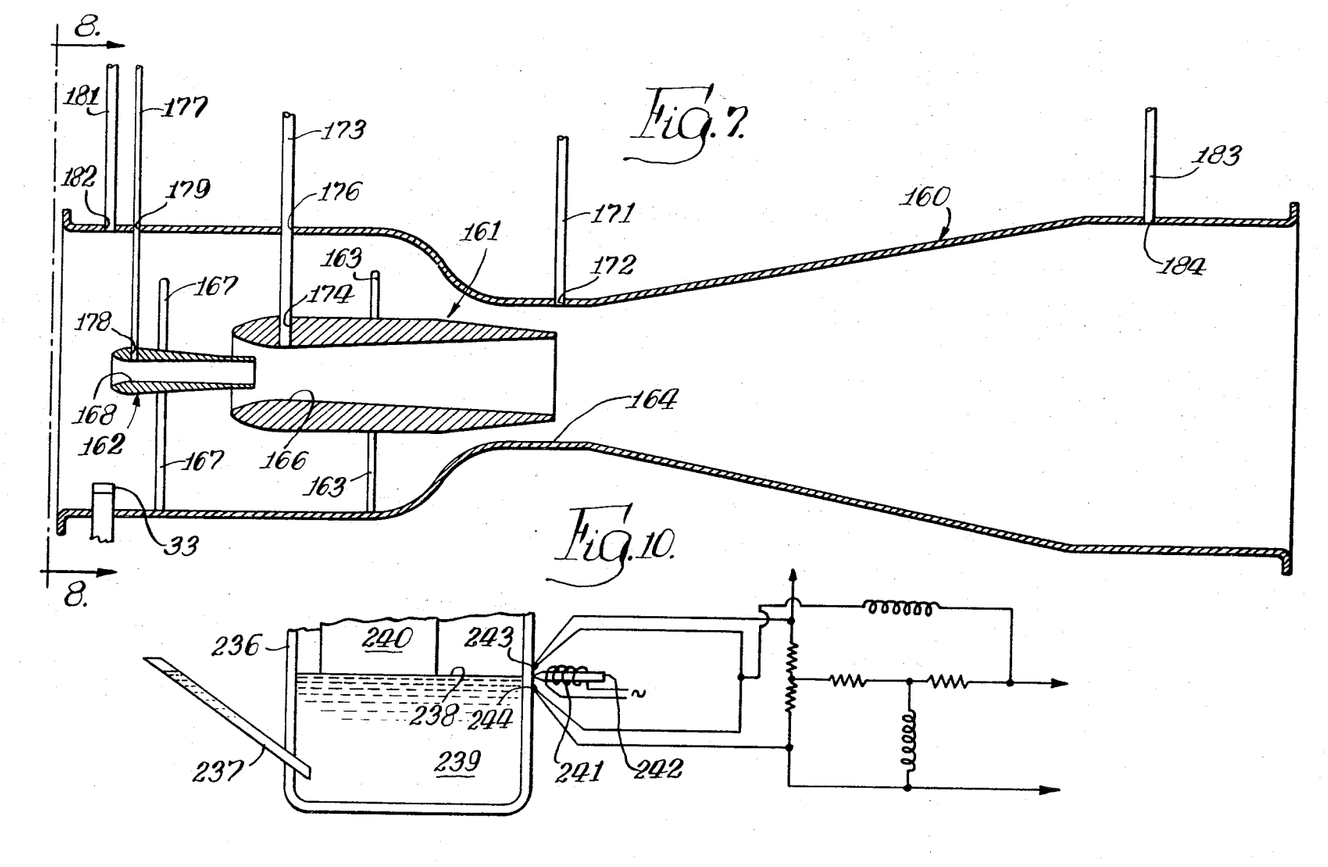
FIG. 7 is a fragmentary enlarged sectional view of a portion of the structure shown in FIG. 6.
FIG. 10 is a fragmentary view showing a portion of the system for measuring fuel level.

With reference to FIGS. 6 to 8, the venturi arrangement 31 (FIG. 2) for measuring the mass of air per unit of time flowing into the carburetor 19 comprises, in the present instance, three concentric air horns 160, 161 and 162 which are of progressively decreasing size. The medium-size air horn 161 is mounted within the largest air horn 160 and is supported therein by three radially extending struts 163. The largest air horn 160 includes a constriction or venturi indicated by the reference numeral 164, and the downstream end of the medium-sized air horn 161 terminates at approximately the entrance of the venturi 164. The medium-sized air horn 161 also includes a venturi 166, and the downstream end of the small-sized air horn 162 terminates at the entrance of the venturi 166. The air horn 162 includes a venturi 168 and is also supported concentrically within the large-sized air horn 160 by a plurality of radially extending struts 167.

To sense the pressure within each venturi while air is flowing therethrough, a conduit or tube 171 is positioned in a hole 172 through the wall of the large air horn 160, the inner end of the tube 171 opening into the venturi 164. Another tube 173 extends through a hole 174 in the medium-sized air horn 161, and the inner end of the tube 173 opens into the venturi 166. The tube 173 also extends outwardly through a hole 176 through the wall of the horn 160. The pressure within the venturi 168 of the small horn 162 is sensed by a tube 177, the inner end of the tube 177 extending through a hole 178 in the wall of the horn 162 and opening in the venturi 168. The tube 177 also extends outwardly through a hole 179 in the wall of the large horn 160. The pressure at the downstream end of the large horn 160 is sensed by a tube 183 which is positioned in a hole 184 in the wall of the horn 160.

As is well known, the amount of air flowing through a venturi may be determined if the venturi size is known and if the difference between the air pressure at the entrance to the venturi and at the throat of the venturi is known. The pressure at the entrance to the air horn is sensed by a tube 181 located in a hole 182 through the wall of the large air horn 160 at the entrance thereof, and as will be discussed hereinafter, the pressure in the tube 181 is compared with the pressures in the venturis as sensed by the tubes 171, 173 and 177.

With reference to FIG. 6, the tubes 171, 173, 177 and 183 are connected to a switching device 186 for selectively connecting one of the tubes 171, 173, 177 or 183 to an outlet tube 187 which leads to the sensor 35. The switch 86 may be manually operated or it may be automatically operated in response to signals received from a card reader to be described in connection with FIG. 11. The tube 181 which senses the high pressure at the upstream end of the air horn 160 is connected directly to another input of the sensor 35. The transducer 35 senses the difference in pressure between the high pressure tube 181 and one of the four tubes 171, 173, 177 and 183, depending upon the position of the switch 186.

The transducer 38 preferably includes a bellows 188 and a variable resistor 189 generally simiar to the bellows 111 and variable resistor 114 arrangement shown in FIG. 3. The main difference between the bellows 188 for the air flow and the bellows 111 for the fuel flow is that the former is larger due to the relatively small pressure drop encountered in a venturi as compared with the orifice. The high pressure tube 181 may be connected to the inside of the bellows and the tube 187 may be connected to the outside. The variable resistor 189 is connected in an oscillator circuit to be described, which produces a variable frequency signal on the conductor 39.

When air flows through the horn 160 to the carburetor, the air pressure at the tube 181 will be greater than the pressure at any of the tubes 177, 173, 171 and 183. Since the tube 183 does not open at the throat of a venturi, the pressure difference between the tubes 181 and 183 will be due to frictional losses resulting from air flow through the horn. The pressure difference between the tubes 181 and 171 is due to the usual venturi effect. The pressure difference between the tubes 181 and 173 is also due to the venturi effect. Since the downstream end of the horn 161 terminates in the venturi 164, the pressure drop due to the venturi 164 appears at the outlet of the horn 161, thus causing increased air flow through the horn 161 and pressure drop in the venturi 166. Similarly, the pressure drop in the venturi 168 of the air horn 162 is relatively large because its downstream end terminates in the throat 166 of the horn 161, and the pressure drops in the venturi 164 and in the venturi 166 multiply the effectiveness of the venturi 168. For a given air flow rate the pressure difference between the tubes 181 and 177 will be greatest; that between the tubes 181 and 173 will be the next greatest, that between the tubes 181 and 171 will be next greatest, and that between the tubes 181 and 183 will be the least. Consequently, when the engine is operating at very low speeds, the switch 186 is adjusted to connect the tube 177 only to the transducer 38, and as the engine speeds up the operator turns the switch 186 to connect the tubes 173, 171 and 183 in succession to the transducer 38. Each of the tubes 177, 173, 171 and 183 is thus used in a different range of air flow and in each range of air flow the pressure differential is approximately the same. Consequently, the signal out of the transducer 38 sweeps through approximately the same range of frequencies. Thus, the structure shown in FIGS. 6 to 8 is advantageous because only a single transducer is required to measure a wide range of air flows.

As previously mentioned, the system includes a plurality of transducers, such as the transducers 38 and 44, which sense various operating parameters of the carburetor and the engine and generate electrical signals having frequencies which are functions of the parameters. Each transducer includes an oscillator circuit of the character shown in FIG. 9, this oscillator circuit being an improvement over the circuit shown in FIG. 3 of Vern C. Vanderbilt U.S. Pat. No. 3,308,360. FIG. 3 of the above patent shows an oscillator circuit having a notch tuning network including a pair of potentiometers, the wipers of the potentiometers being connected together and to a movable member which is responsive to a parameter being sensed. The frequency of the oscillator is linearly related to variations in the resistances of the two potentiometers. While the oscillator circuit shown in the above patent works well, it is constructed to sense only one parameter at a time.

The circuit shown in FIG. 9 of the present application is capable of responding simultaneously to two or more parameters. The present oscillator circuit includes an amplifier 201 having an output connection 202 and a differential input arrangement including a positive input 203 and a negative input 203a. An input signal applied to the positive input 203 produces an output changing in a direction the same as (or in phase with) that input. An input signal applied to the negative input 203a produces an output changing in a direction opposite to (or out of phase with) the input. A buffer amplifier (not shown) is preferably connected to the output 202 of the amplifier 201. A conductor leads from the output 202 to an amplitude stabilization lamp 221, a capacitor 206 and to the positive input 203 thus forming a positive feedback loop. A resistor 207 connected between ground and the input 203 provides a load for the amplitude stabilization lamp 221. While some method of amplitude stabilization is necessary, a method other than a lamp may be used. A negative feedback loop includes a notch tuning circuit connected to the input 203a of the amplifier 201, comprising a pair of series-connected potentiometers 208 and 209, the junction of the two potentiometers 208 and 209 being connected to ground potential through a coil 211 and a coupling capacitor 212. The resistor 209 is connected to a resistance network 210 including two serially connected resistors 213 and 214, and two additional serially connected resistors 215 and 216. The two resistors 215 and 216 are connected in parallel with the two resistors 213 and 214, and the juncture of the two resistors 214 and 216 is connected to ground through a coupling capacitor 219. The juncture of the two resistors 213 and 215 is connected to the feedback conductor 204. The juncture of the two resistors 213 and 214 is connected to the variable resistor 209, and the juncture of the two resistors 215 and 216 is connected through a coil 222 to the negative input 203a of the amplifier 201.

The oscillator drive signal from the output of the amplifier 201 appears on the conductor 204 and is fed through the positive feedback loop, including the lamp 221 and the capacitor 206, to the amplifier positive input 203. The drive signal is also connected to the drive terminal 223 of the negative feedback loop including the notch circuit. At the notch frequency, which is the frequency to which the notch circuit is tuned, a positive feedback signal appears at the positive input 203 of the amplifier, causing the oscillator to oscillate. The frequency at which oscillation occurs may be changed by varying the values of the parameters of the notch circuit.

Considering first the operation when the resistances of the resistance network 210 are held constant, if the resistances of the two variable resistors 208 and 209 were simultaneously increased, the frequency of oscillation would increase. Further, the frequency will vary as a direct function of changes in resistances of the two potentiometers 208 and 209 when the two potentiometers are equal and the amounts of increase are equal. If only one of the two potentiometers 208 and 209 were increased, the frequency of oscillation would increase as the square root of the increase of resistance.

Considering the influence of changes in the resistance network 210 on the operation of the oscillator circuit, it is an important feature of the present invention that a change in the resistance of one of the resistors of the resistance network 210 will also change the frequency of oscillation, and the effect of changing the resistance of one or both of the resistors 208 and 209 and also changing one or more of the resistors of the resistance network 210 is to effect a multiplication of the changes. For example, if the effect of a change in the resistor 208 were to increase the frequency of oscillation by a factor of 3.0 and the effect of a change in the resistor 216 were to change the frequency of oscillation by a factor of 0.9, the net effect of changing both the resistor 208 and the resistor 216 would be to increase the frequency by a factor of 2.7. The foregoing is true so long as the impedence at operating frequencies of the components comprising the coils 211 and 222 and the resistors 208 and 209 is large as compared with the impedence of the resistance network 210. A mathematical evaluation of the operation of the oscillator circuit is as follows:

The oscillator output frequency is a function of the resistors and the coils which tune the negative feedback loop. While the coils 211 and 222 could be adjusted to vary the frequency, it is much more convenient to adjust the resistors. The frequency of the oscillator is given by the equation:

$$f = \sqrt{R_{208}} \ \sqrt{R_{209}} \ \sqrt{\alpha} \ \sqrt{L_{211}} \ \sqrt{L_{222}} \ \sqrt{\beta} \quad (1)$$

where $$\alpha = R_{216}/R_{215} + R_{216} \text{ and} \quad (2)$$
$$\beta = R_{214}/(R_{213} + R_{214}) \quad (3)$$

The numeral suffixes in equations (1), (2) and (3) correspond to the reference numerals of the circuit elements shown in FIG. 9. For example, $R_{208}$ in equation (1) is the resistance of resistor 208 in FIG. 9.

The equation for the mass flow rate of the air through a venturi is:

$$M_{air} = K_1 \ \sqrt{P_{abs}} \ \sqrt{\Delta P/} \ \sqrt{T_{abs}}. \quad (4)$$

where $K_1$ is a constant;

$P_{abs}$ is the absolute or barometric pressure;

$\Delta P$ is the pressure drop in the venturi; and $T_{abs}$ is the absolute temperature of the air.

Similarly, the mass flow rate of the fuel through the orifice is:

$$M_{fuel} = K_2 \ \sqrt{\Delta P/f(T_{abs})} \quad (5)$$

where $K_2$ is a constant;

$\Delta P$ is the pressure drop through the orifice; and $f(T_{abs})$ is a function of the absolute temperature and the flow characteristics of the fuel.

It will be apparent from equation (1) that the variables are square root functions and that changes in any two or more of the variables will effect a multiplication of the changes. All of the variables in equations (4) and (5), with the exception of $f(T_{abs})$, are clearly square root functions. In practice, $f(T_{abs})$ is also in effect a square root function because the fuel temperature sensor 42 is designed to match a particular fuel. Mass flow of a fuel is a function of its viscosity and density which of course vary with temperature, and the sensor 42 is designed with a temperature to resistance characteristic which produces a nearly square root variation for a particular fuel.

For example, when the mass flow rate of air is being measured, the potentiometer of the barometer 34 (FIG. 2) corresponds to the resistor 209 (FIG. 9), the potentiometer of the bellows sensor 35 corresponds to the resistor 208, and the temperature sensor 33 corresponds to the resistor 216. In such a circuit arrangement, the resistors 213 to 215 may also be made variable so that standardization between measuring systems may be obtained.

When the mass flow rate of fuel is being measured, the potentiometer 114 connected to the bellows 111 corresponds to the resistor 208, for example, and the temperature sensor 42 corresponds to the resistor 209. If desired, a device may be provided to sense the viscosity of the fuel, such a device including a potentiometer connected as the resistor 216.

To obtain a linear relation between frequency and the mass flow being sensed, it is important that the variable resistance of the sensors for the parameters be varied linearly with changes in the magnitudes of the parameters.

FIG. 10 illustrates a circuit for sensing the fuel level in a cup-shaped metal float bowl 236 of the carburetor. The float bowl 236 has an outlet tube 237 connected thereto, the inner end of the tube 237 extending into the interior of the bowl 236 below the level 238 of the fuel 239 in the bowl 236. The tube 237 slants upwardly and terminates within the carburetor venturi in the conventional manner. A conventional fuel supply line and valve (not shown) is also provided for feeding fuel to the bowl 236. A float 240 controls operation of the valve. The fuel level sensing circuit comprises an electrical heating coil 241 preferably wound around a heat-conducting metal core 242 which has a pointed end positioned against the outer wall surface of the float bowl 236. Two heat-sensitive electrical elements 243 and 244 are positioned above and below the heating coil 51. The two temperature-sensitive elements 243 and 244 may comprise thermistors which are connected in an oscillator circuit of the character shown in FIG. 9. In the portion of the oscillator circuit shown in FIG. 10, the thermistors 243 and 244 are respectively equivalent to the resistors 215 and 216 (FIG. 10) of the oscillator circuit. Thus, variations in the resistances of the two thermistors 243 and 244 will effect a change in the frequency of oscillation in the oscillator circuit.

When the heating coil 241 is energized, the wall of the metal float bowl 236 adjacent the metal core 242 will be heated and the wall will conduct heat from the area of the core 242. Assuming that the liquid level 238 is approximately at the level of the core 242, the thermistor 243 will sense a higher temperature than the thermistor 244 because the liquid 239 opposite the thermistor 244 will conduct heat more easily than the air opposite the thermistor 243. If the level 238 of the liquid were at a lower point, for example, below the level of the thermistor 244, the walls adjacent the two thermistors 243 and 244 would be at approximately the same temperature, and this temperature would be relatively high. If the level 238 were above the level of the element 243, the resistances of the two elements 243 and 244 would again be approximately equal but the temperature would be relatively low. It will be apparent, therefore, that with the connections as shown in FIG. 10, the frequency will peak when the core 242 is adjacent the level 238 and the temperature difference is greatest between the thermistors 243 and 244.

Instead of connecting both of the thermistors 243 and 244 in a single oscillator circuit as shown in FIG.

10, the two thermistors could be connected as control resistors, such as the resistor 213, in separate oscillator circuits such as the oscillators of the transducers 38 and 44 as shown in FIG. 2. If the other parameters were held constant, the difference in the frequencies of the two oscillators would be proportional to the difference in temperatures of the two thermistors. Since the greatest temperature difference would occur when the heating coil is at the level 238 of the fuel 239, the fuel level could be determined by noting the position of the probe at which the greatest frequency difference occurs. As will be explained in connection with FIG. 11, the system may be programmed to compute the ratio of the two frequencies, and this ratio would be greatest when the probe is adjacent the fuel level.

Figure 11:
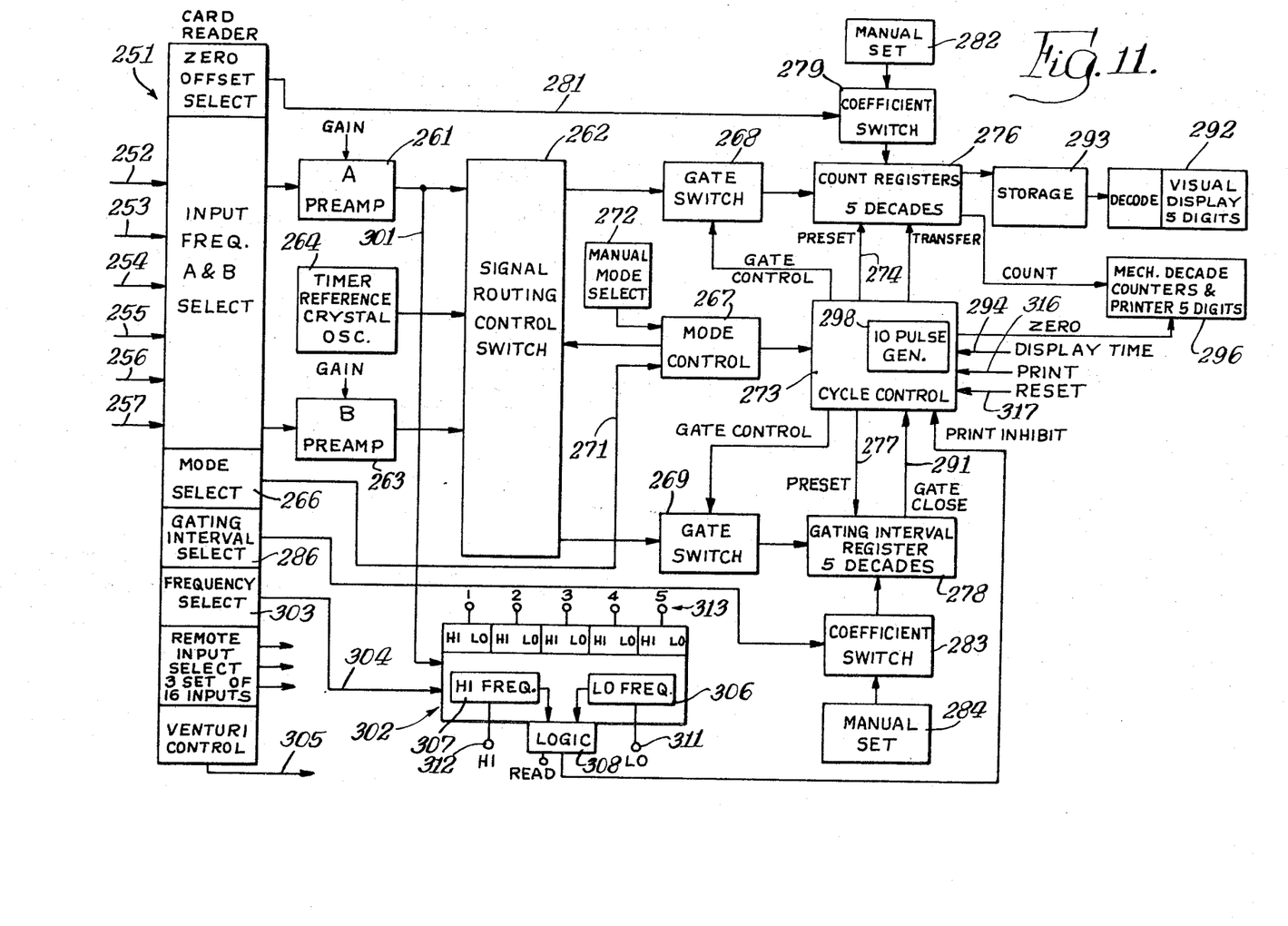
FIG. 11 is a block diagram of a computer forming part of the system.

FIG. 11 illustrates in greater detail the control unit 66, the counter 68, the display-printer 71, and the range selector and control 73, which receive the frequency modulated signals from the transducers, compute the desired information, and provide a visual display of the computed information and/or a printed record of the information. The structure shown in FIG. 11 may include manual controls and/or a card reader, for example. In the present construction, both are provided. Further, the structure provides both a visual display and a printed record.

The structure illustrated in FIG. 11 includes a conventional card reader 251 which, for example, has six signal inputs 252 through 257. In the present instance the input 252 is connected to receive the signal from the transducer 38 representing air flow rate, the input 253 is connected to receive the signal from the transducer 44 representing fuel flow rate, the input 254 is connected to receive the signal from an oscillator and the fuel level sensing probe of the character shown in FIG. 10, the input 255 may be connected to receive the output of the coil 59 representing engine speed, and the inputs 256 and 257 may be connected to receive any other parameters being sensed, such as acceleration and ambient temperature. The card reader 251 receives a prepunched card such as the card 67 shown in FIG. 2, and, depending upon the arrangement of the punched information, programs the remainder of the components for operation in a required mode.

Assuming that a card has been inserted into the card reader 251, which is punched to obtain a reading of air-to-fuel ratio, the card reader 251 directs the air flow rate signal appearing on the input 252 to a pre-amplifier 261 and to a routing control switch 262. The fuel flow rate signal appearing on the input 253 is directed to a pre-amplifier 263 and to another input of the routing control switch 262. The card reader 251 also provides a mode select output 266 which sets a mode control circuit 267 to route the signals from the pre-amplifiers 261 and 263 to two gate switches 268 and 269, this being accomplished by a signal received on a conductor 271 by the switch 262 from the mode control 267. The mode control 267 also includes a manually operable mode select control 272 which may be set in the event the card reader is not used. The mode control 267 also signals a cycle control 273 to begin a computing cycle. At the beginning of each computing cycle, the cycle control 273 generates a preset signal on a conductor 274 which presets a count register 276 to zero or to a preset number. The register 276 includes, in the present example, five decade counters. In certain operations, the count register 276 is preset to a given number by a signal from a coefficient switch 279 which in turn receives directions on a conductor 281 from the card reader 251 or from a manually operable control 282. The coefficient switch 279 is operable to preset the count register 276 at the beginning of each cycle to a given number, the number depending upon the setting of the switch 279, and the count register 276 counts upwardly from the preset number, such operation being useful when a curve of the parameter being counted does not start at zero. The cycle control 273 also generates a preset signal on a conductor 277 which is received by a gating interval register 278 having, for example, five registers. The gating interval register 278 also receives an input signal from a co-efficient switch 283 which may be manually set by a control 284 or automatically set by a gating interval select output 286 from the card reader 251. The coefficient switch 283 is operable to preset the register 278 at the beginning of each computing cycle to a predetermined number, this number representing the time interval for the counting operation. In the present instance, the register 278 is preset to a number below zero, and the register 278 in each computing cycle counts upwardly the number of pulses from the gate switch 269 until the register 278 reaches zero.

Briefly, the operation of the foregoing portion of the computer in each cycle is as follows: after a card is inserted into the card reader 251, selected signals, such as the signals on the inputs 252 and 253, are passed to the pre-amplifiers 261 and 263 and to the routing control switch 262. The coefficient switches are also set by the signals from the card reader 251. The mode control 267 actuates the cycle control 273 to begin a computing cycle and at the beginning of each cycle the cycle control 273 presets the count register 276 and the gating interval register 278 to the values to which the coefficient switches 279 and 283 are set. The cycle control 273 then generates signals on two gate control inputs 287 and 288 of the gate switches 268 and 269, respectively. These signals open the gate switches 268 and 269 and thus pass the air flow rate and the fuel flow rate signals to the two registers 276 and 278. The count register 276 then begins counting pulses upwardly from its preset number, and the gating interval register 278 begins counting toward zero from its preset number. When the gating interval register 278 reaches zero count, it generates a signal on a conductor 291 which is received by the cycle control 273 causing it to close the two gate switches 268 and 269. The count contained in the count register 276 is, of course, the preset number plus the number of air flow rate pulses received during the time required for the gating interval register 278 to receive the preset number of fuel flow rate pulses.

The count contained in the count register 276 is fed to a five-digit visual display 292 which may comprise Nixie tubes. A storage circuit 293 is preferably connected between the register 276 and the display 292 which, when manually set, will cause the display to hold a count until a subsequent count is to be displayed. If the storage circuit 293 is not manually actuated, the display 292 will indicate the count contained at any instant in the count register 276.

The length of the display time may, if desired, be manually adjusted by an input 294 to the cycle control 273, the input 294 adjusting the time between successive cycles initiated by the cycle control 273.

As previously mentioned, it is preferred that a printed record be made of computed data, and to this end there is provided a five-digit printer 296 which has its input connected to an output of the count register 276. The printer 296 also has a zero or reset input connected to the cycle control so that the printer 296 may be reset to zero. The printer 296 may, for example, be an electronic printer or a ratchet operated mechanical printer. Where it is a mechanical printer, the cycle control 273 also includes a "ten-pulse generator" 298 which, on receipt of a print command signal, transfers a series of 10 pulses to both the count register 276 and to the printer 296. The printer 296, in response to the ten pulse series, receives the count on the register 276 and prints it, in an operation known to those skilled in the art. While the foregoing operation has been described in connection with a mechanical printing structure, it should be understood that a completely electronic printing apparatus could be employed.

When evaluating the operation of the carburetor, it is desirable to be able to take spot readings or measurements at different air flow rates. In the present example, measurements are taken at five different flow rates. For a particular reading, the switch 186 of the multiple venturi structure 31 is set to connect a venturi to the transducer 35, the connected venturi being proper for the air flow range in which the spot reading is to be taken. In each range, the amount of air drawn through the carburetor varies and consequently the frequency of the signal appearing at the output of the pre-amplifier 261 also varies. The pre-amplifier 261 output, which indicates the mass flow rate of air, is also connected by a conductor 301 to the input of a range circuit 302. In the present construction, it is contemplated that a different card be inserted into the card reader 251 for each spot reading and, for each card, a range output 303 of the card reader 251 generates a signal which is received by the range circuit 302 on a conductor 304. The circuit 302 includes two frequency responsive electronic switches 306 and 307 which are connected to receive the frequency modulated signal representing the mass flow rate of air. As previously mentioned, a separate card is used in the present example for each reading, and each card programs the system to take a reading in a certain range. In addition to the signal on the conductor 304, a signal is also provided on an output 305 of the reader 251 which is connected to the switch 186 (FIG. 6) in order to connect the proper venturi required in the air flow range in which a reading is to be taken. The signal appearing on the conductor 304 sets the switch 306 so that it switches at the low end of the range, and the switch 307 so that it switches at the high end of the range. When the frequency of the air flow rate signal is within the range, the switches 306 and 307 actuate a logic circuit 308. Prior to this time, the logic circuit 308 delivers a print inhibit signal, but when the frequency of the air flow signal is in the designated range, the inhibit signal is removed and the cycle control orders a print operation. Further, if the frequency of the signal on the conductor 301 is below the designated range, the switch 306 energizes an indicator light 311, and if the frequency is above the range, the switch 307 energizes a light 312. In addition, the circuit 302 may also include a plurality of manual inputs indicated generally by the numeral 313 which may be used in place of the card reader 251.

If desired, the cycle control 273 may also be provided with a two-position manually operable print switch 316. The switch 316 may be set in an "on" position where the system will automatically perform a printing operation at the end of each computing cycle, or in an "off" position where the system will perform a printing operation only when the switch 316 is momentarily turned on. The cycle control 273 may also include a manually operable reset control 317 which may be used to initiate a new computing cycle at any desired time.

While the card reader 251 has been described as requiring a separate card for each speed range and a separate card for each computing mode or measurement to be taken, it should be understood that a different type of card reader and card could be employed which may be programmed to consecutively compute in different modes for each speed range, and to initiate computing cycles automatically in various speed ranges.

While the circuit 302 has been described in an operation where it inhibits a print signal except when the engine speed is within a predetermined range, it should be understood that such a circuit is also useful for indicating error in readings where a given frequency is outside of a specified range of frequencies.

The structure shown in FIG. 11 has been described above in operation in the "ratio mode" wherein the ratio of the air and fuel mass flow rate signals is obtained. If operation is required in a mode for measuring a parameter such as engine speed, the switch routes the signal from an oscillator 264 to the register 278 and the speed representative signal to the register 276. The frequency of the oscillator 264 is fixed at, for example, 100 KH$_z$, and is used as a time reference signal. Since the frequency of the speed signal varies linearly with speed, operation of the computer-counter can be described by the equation:

$$\text{Output} = mf_1 + b \qquad (6)$$

where $m$ is the gate time of register 278; $f_1$ is the frequency of the signal into the register 276; and $b$ is the count which is preset into the register 276.

When the system is operating in the ratio mode, as when obtaining the air-to-fuel ratio, it operates according to the equation:

$$\text{Output} = (mf_1/f_2) + b \qquad (7)$$

where $f_2$ is the frequency of the signal into the register 278 and the other quantities are the same as in equation (6).

We claim:

1. A variable frequency oscillator circuit comprising an amplifier including an output connection and positive and negative input connections, means connecting said output connection to said positive input connection to form a positive feedback loop, a resistance bridge including four resistance arms connected to form four bridge corners, at least one of said arms being adjustable, means connecting said output connection to one of said corners and a notch filter including first and second variable resistors connected in series between said negative input connection and another corner which is adjacent said one corner.

2. An oscillator circuit as in claim 1, and further including a first coil connected between the junction of said first and second variable resistors and the corner of said bridge which is opposite said one corner, and a second coil connected between said negative input connection and the corner of said bridge which is opposite said another corner, said coils, and said variable resistors forming a notch filter and the frequency of said oscillator being equal to the frequency to which said filter is tuned, and said frequency changing as a function of the product of changes in a resistance arm of said bridge and one of said first and second variable resistors.

3. An oscillator circuit as in claim 2, wherein said circuit is connected in a resistance-to-frequency transducer apparatus including first, second and third sensors, said first and second sensors being connected to respectively vary said first and second variable resistors, and said third sensor being connected to vary said adjustable arm of said resistance bridge.

* * * * *